United States Patent [19]

Gearhart

[11] Patent Number: 4,498,284
[45] Date of Patent: Feb. 12, 1985

[54] CHAIN LINK
[75] Inventor: Gordon E. Gearhart, Atlanta, Ga.
[73] Assignee: E.V. Camp Steel Works, Inc., Atlanta, Ga.
[21] Appl. No.: 381,892
[22] Filed: May 25, 1982
[51] Int. Cl.³ .............................. F16G 13/06
[52] U.S. Cl. ...................................... 59/84
[58] Field of Search .................. 59/84, 85, 74

[56] References Cited
U.S. PATENT DOCUMENTS 168,081 9/1875 Chamberlin ........................... 59/84
2,103,972 12/1937 Harris .................................. 59/84

FOREIGN PATENT DOCUMENTS 941597 4/1956 Fed. Rep. of Germany .......... 59/84

Primary Examiner—Leon Gilden
Assistant Examiner—Linda McLaughlin
Attorney, Agent, or Firm—Wegner & Bretschneider

[57] ABSTRACT

An elliptical chain link having a "D" shaped cross sectional configuration along the longitudinal sides of the ellipse is shown and described. In addition there is a unique relationship between the cross sectional areas and configurations of the ends and sides of the link shown and described.

14 Claims, 3 Drawing Figures

CHAIN LINK

BACKGROUND OF THE INVENTION

1. Field of the Invention

This invention relates to chain links which are used for pulling heavy loads and which may be dragged along the ground or other surfaces. The wear experienced by chain links after long periods of use and dragging may become excessive and weaken the chain.

In the manufacture and use of chains it is desirable to reduce weight and link size as much as possible in order to conserve material and to reduce weight for ease of use and handling.

2. Description of the Prior Art

In the art of chain link manufacture and use, many designs have evolved which have uniform cross sectional areas and uniform cross sectional configurations. Such designs may be produced by merely bending a wire or rod to the desired link configuration.

U.S. Pat. No. 3,864,906 shows a link which uses different cross sectional areas and shapes in order to maximize performance and reduce overall weight. The link end portions are somewhat circular in shape and have radii $R_0$ and $R_1$ designed for maximum link to link contact. Still further, the end portions and transverse bar portions have a greater cross sectional area than do the side or longitudinal portions. This design, however, does not provide for increased material in the region where wear is caused by dragging.

U.S. Pat. No. 168,081 has an oval shaped end portion A,C, and reduced cross sectional areas at the center of the link B,E,D, which removes weight, and which lowers resistance to wear.

U.S. Pat. No. 3,544,092 shows a chain link for use in a kiln which has a non-oval cross sectional which facilitates the function of reducing the area of contact which in turn enhances the self cleaning function.

SUMMARY OF THE INVENTION

This invention differs from the prior art set forth herein because it provides a unique "D" shaped cross sectional area along the longitudinal side portions of the chain link which serves to provide a wide flat area along the portion of the link which is dragged along the ground or other surface.

This invention also provides for approximately equal cross sectional areas around the perimeter of the elliptical shaped link wherein the areas may gradually change shape from a "D" shaped cross section along the longitudinal sides to an oval shaped cross section at the ellipse ends.

This invention further contemplates the use of a rectilinear cross sectioned transverse portion which may have a cross sectional area which is less than half of that of the elliptical portions of the link.

It is an object of this invention to provide a chain link having an increased surface area along the sides of the elliptical portion which will decrease wear damage caused by dragging the chain.

It is another object to provide a chain which has cross sections designed for maximum drag wear, life, maximum strength, and minimum weight.

DESCRIPTION OF THE PREFERRED EMBODIMENT

Figure 1:
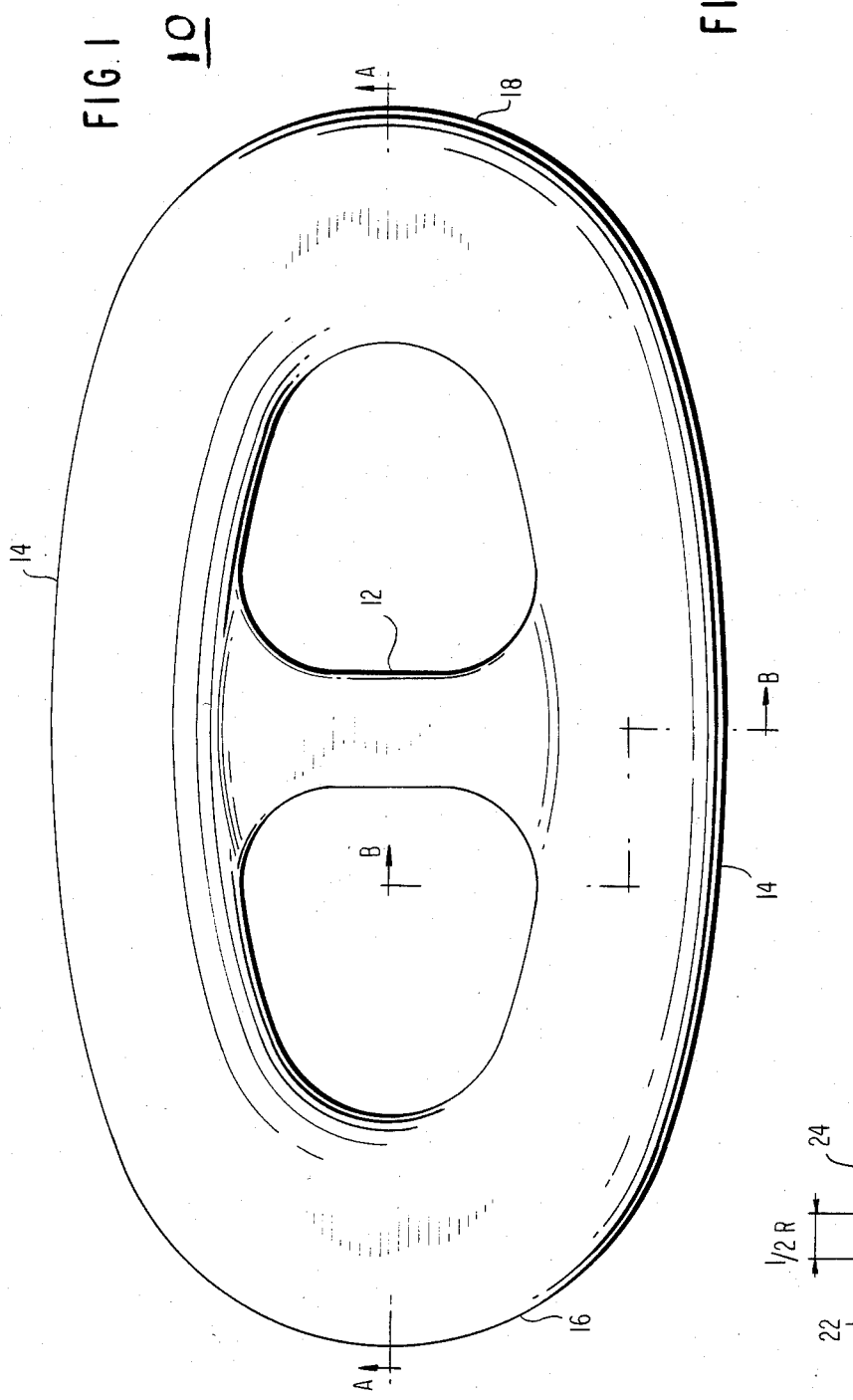
FIG. 1 shows a top view of a chain link.
Figure 2:
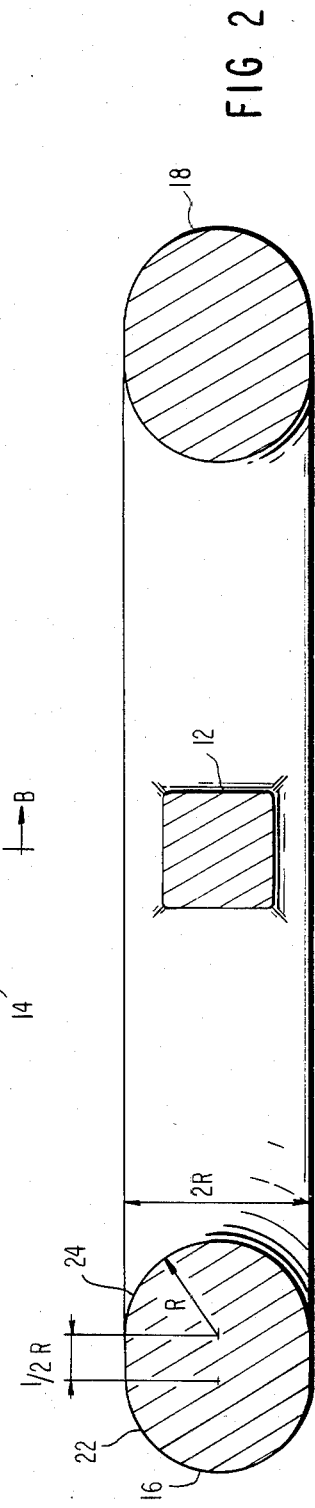
FIG. 2 shows a cross sectional view taken along line A—A of FIG. 1.

Referring first to FIG. 1, there is shown a chain link 10 having an elliptical shape whose plane is parallel to the drawing. In the preferred embodiment a transverse section 12 is provided to improve overall strength and rigidity of the link. The transverse section 12 has a rectilinear cross section area (FIG. 2) which is one half or less than the cross sectional area of the elliptical portion or the "D" shaped portion of the link 10. Although the transverse section is shown and discussed, it is apparent that the "D" shaped cross sectional portion of the longitudinal side may be used without a transverse section, or with any other suitable cross section.

Figure 3:
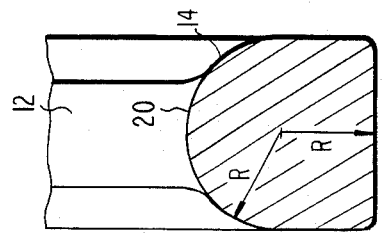
FIG. 3 shows a cross sectional view of the link taken along line B—B of FIG. 1.

The cross section shown in FIG. 3 is the "D" shaped portion 14 of the link. The flat portion of the "D" is on the outside face of the longitudinal side portion of the ellipse, and is perpendicular to the plane of the elliptical body section depicted in FIG. 1. The cross sectional area of the "D" portion is preferably substantially equal to the cross section of the elliptical ends 16 and 18. The transition from the "D" shape to the oval shape of the ends is gradual.

The preferred embodiment utilizes a fixed relation between the oval ends and the "D" shaped sides. As can be seen, the "D" shape may incorporate a semi-circular cross section portion 20 which has a radius R and a rectilinear cross sectional portion having a length 2R and a width R. The rectangle side having a length 2R is placed along the diameter of the semi-circle having a diameter 2R.

The oval shaped cross section of the elliptical link is approximately the same cross sectional area as the "D" shaped portion. Each oval cross sectioned end consists of two semi-circular sections 22 and 24 which have a radius R where R is the same dimensions as R in FIG. 3. The oval's semi-circles are joined by a rectangle portion having dimensions of 2R and ½R. The cross sectional area of the oval shaped portion in the above example is approximately 16% greater than the cross sectional area of the "D" shaped portion. Therefore, a substantial difference in areas would require a difference of at least 20%.

The use of the "D" cross section of the longitudinal side of the elliptical link provides for improved wear characteristics by providing additional surface and material along the drag side of the link. The use of the oval cross section at the end portion of the link provides greater wear strength at the high stress point of the link.

From the above description, it can be seen that an improved unique chain link has been provided. It is to be understood that various alterations, modifications and/or additions may be introduced into the preferred embodiment, without departing from the scope of this invention as set forth in the claims.

What is claimed is:

1. A chain link having variable cross sectional areas which are configured in order to provide improved functional and weight characteristics, comprising in combination:

an elongated elliptical body section, said body section having longitudinal side portions and end portions; wherein said end portions have an ovular shaped cross sectional configuration and said longitudinal side portions have a "D" shaped cross sectional configuration; and the "D" shaped cross sectional portion is formed by a semi-circle having a radius R and the straight portion is formed by a rectangle portion having sides whose length is 2R and whose width is R.

2. The chain link set forth in claim 1 wherein the straight portion of said "D" shaped portion faces outward and is substantially perpendicular to the plane of said elliptical body section.

3. The chain link of claim 1 wherein the cross sectional area of said "D" shaped portion is substantially the same as said end portion cross sectional area.

4. The chain link as set forth in claim 1 further including a transverse section which extends from one longitudinal side portion to the other.

5. The chain link as set forth in claim 4 wherein said transverse section has a rectilinear cross section.

6. The chain link as set forth in claim 5 wherein said transverse section has a cross sectional area which is less than one half of the cross sectional area of said "D" shaped portion.

7. The chain link as set forth in claim 4 wherein said transverse section has a cross sectional area which is less than one half of the cross sectional area of said "D" shaped portion.

8. A chain link having variable cross sectional areas which are configured in order to provide improved functional and weight characteristics, comprising in combination:

an elongated elliptical body section, said body section having longitudinal side portions and end portions; wherein said end portions have an ovular shaped cross sectional configuration and said longitudinal side portions have a "D" shaped cross sectional configuration; and said ovular end portion has two end sections which are semicircular each having a radius R and a rectangular central portion having a length 2R and a width of $\frac{1}{2}$R.

9. The chain link set forth in claim 8 wherein the straight portion of said "D" shaped portion faces outward and is substantially perpendicular to the plane of said elliptical body section.

10. The chain link of claim 8 wherein the cross sectional area of said "D" shaped portion is substantially the same as said end portion cross sectional area.

11. The chain link as set forth in claim 8 further including a transverse section which extends from one longitudinal side portion to the other.

12. The chain link as set forth in claim 11 wherein said transverse section has a rectilinear cross section.

13. The chain link as set forth in claim 12 wherein said transverse section has a cross sectional area which is less than one half of the cross sectional area of said "D" shaped portion.

14. The chain link as set forth in claim 11 wherein said transverse section has a cross sectional area which is less than one half of the cross sectional area of said "D" shaped portion.

* * * * *